Dec. 14, 1965 C. J. HUNT ETAL 3,223,011
ROLL FILM MAGAZINE
Filed Oct. 25, 1963 4 Sheets-Sheet 2

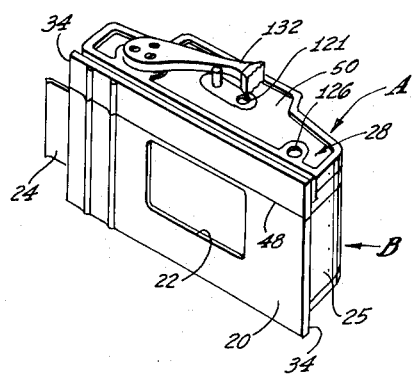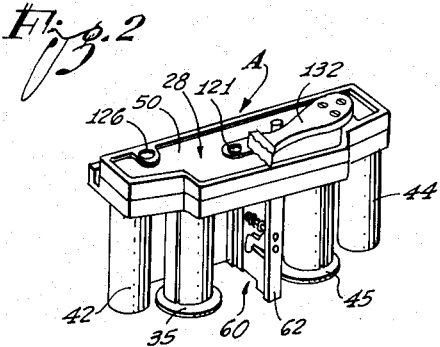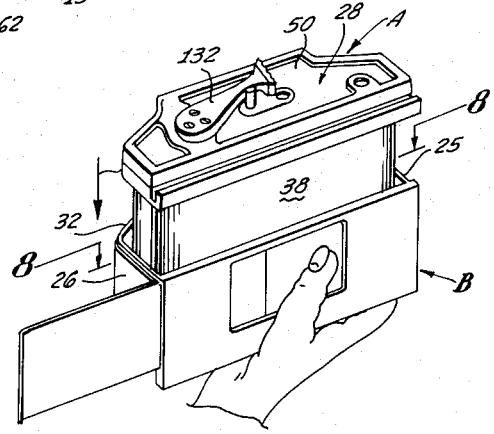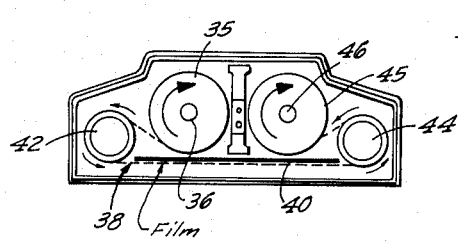

INVENTORS:
Charles J. Hunt
Elwood Swanson

Jacob M. Roberts
Attorney

Dec. 14, 1965   C. J. HUNT ETAL   3,223,011
ROLL FILM MAGAZINE
Filed Oct. 25, 1963   4 Sheets-Sheet 3
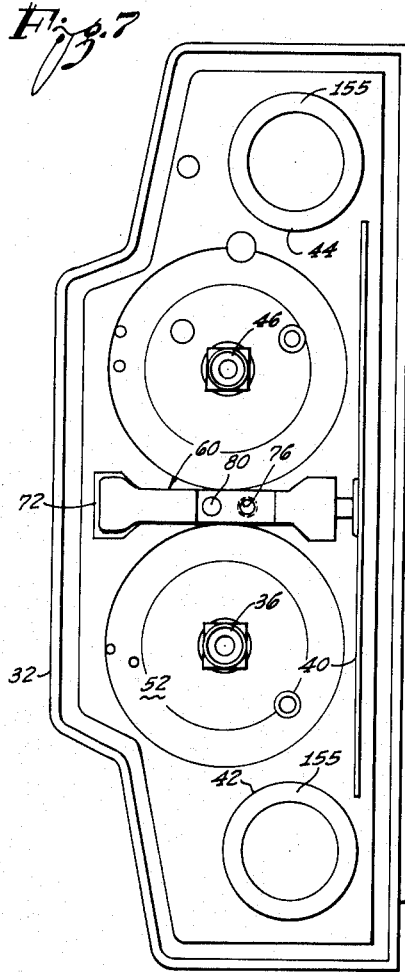
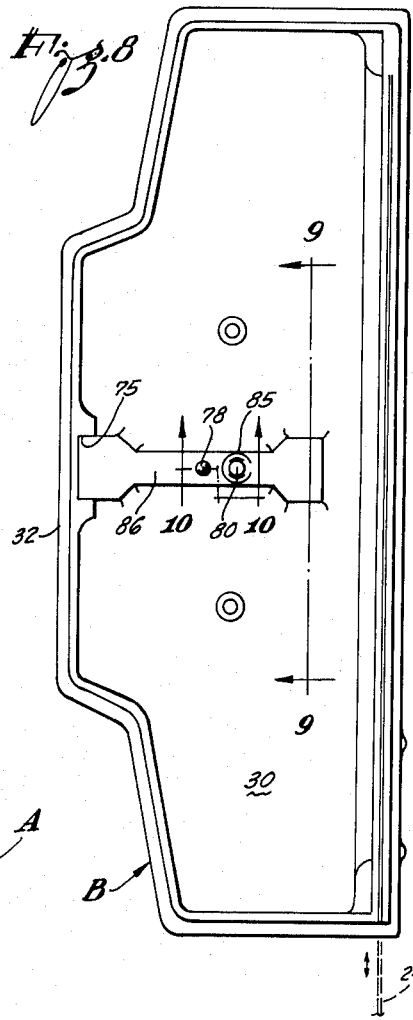
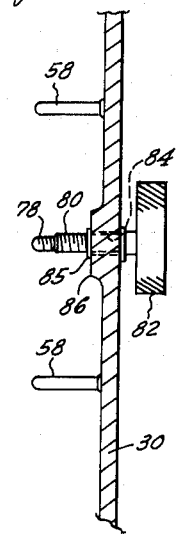
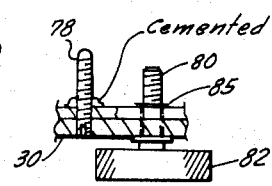
INVENTORS:
Charles J. Hunt
Elwood Swanson
Jess M Roberts
Attorney Dec. 14, 1965  C. J. HUNT ETAL  3,223,011
ROLL FILM MAGAZINE
Filed Oct. 25, 1963  4 Sheets-Sheet 4
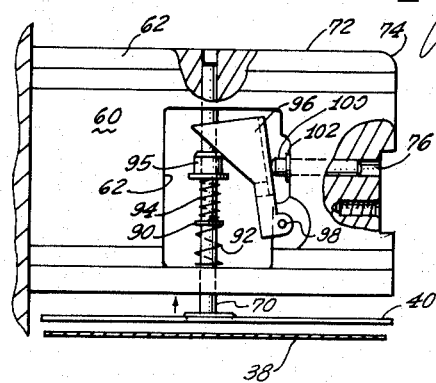
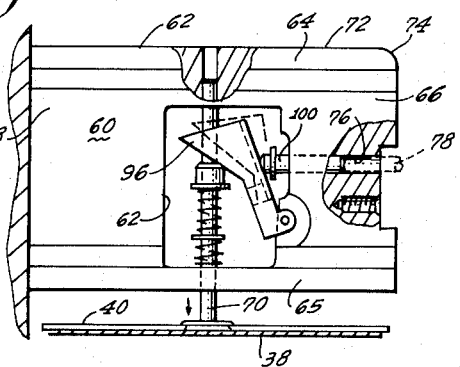
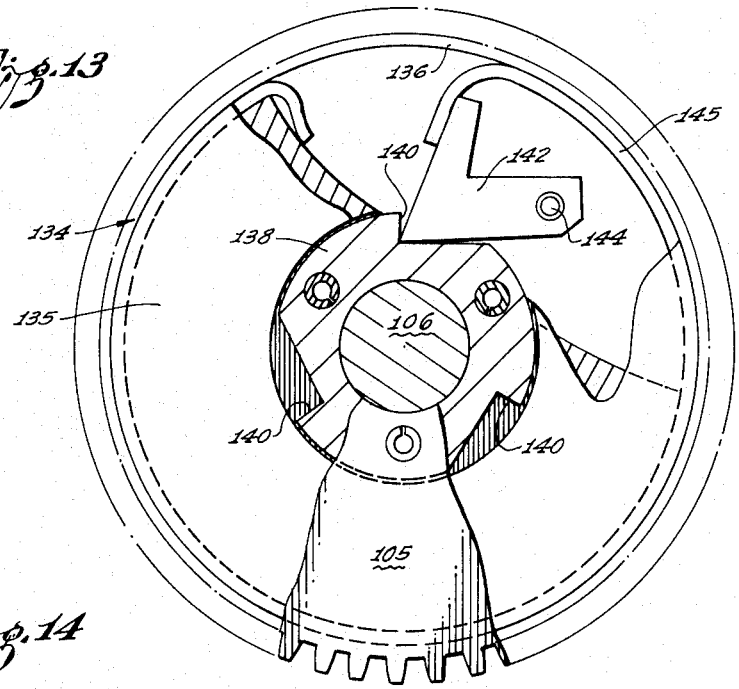
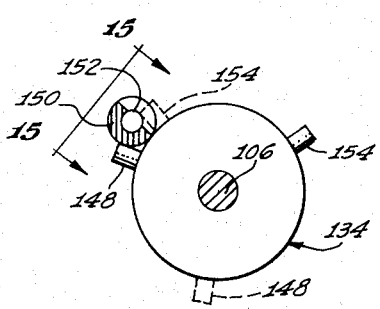
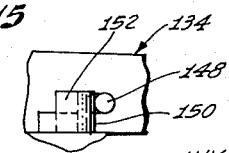
INVENTORS:
Charles J. Hunt
Elwood Swanson
Attorney United States Patent Office 3,223,011
Patented Dec. 14, 1965

3,223,011
ROLL FILM MAGAZINE
Charles J. Hunt, Orange, and Elwood R. Swanson, Garden Grove, Calif., assignors to Beattie-Coleman, Inc., Anaheim, Calif., a corporation of California
Filed Oct. 25, 1963, Ser. No. 318,891
8 Claims. (Cl. 95—34)

This invention relates to a film magazine for a camera and, more particularly, relates to a magazine for roll film incorporating a film transport mechanism.

While the film magazine may be incorporated permanently into a camera construction, the invention has special utility as a roll film pack or adapter for removably mounting on a camera. Such an adapter has a body or housing with a flat inner wall adapted for releasable mounting on the back of the camera. The flat inner wall has a rectangular aperture of the size of the desired exposure frame for positioning at the focal plane of the camera and this aperture is covered by a dark slide in the usual manner when the adapter is removed from the camera.

One of the problems to which the invention is directed arises from the fact that the interior of the removable magazine must be accessible for installing and removing the roll film. For this purpose most film magazines have hitherto been constructed with a hinged or removable cover but such a construction falls far short of providing full and especially convenient access to the interior of the magazine housing and replacement of a roll of film is an awkward and time-consuming task. Other film magazines have been constructed for removal of at least parts of the film transport mechanism but such an arrangement also makes the film replacement unnecessarily difficult and, in addition, creates the further problem of constructing a mechanism that is removable but nevertheless is sturdy, tight and efficient when in use.

To meet this situation, the present invention makes the magazine housing in two sections that split longitudinally along a line spaced to one side of the rectangular exposure aperture in the flat side of the housing. Thus a first of the two housing sections is in the form of a wide open-sided shell having one side wall of the housing, this side wall being integral with extensive adjacent portions of the inner wall, outer wall and two end walls of the housing. The second housing section is narrow and comprises the second side wall of the housing with at most only narrow portions of the inner wall, outer wall and the two end walls.

The film transport mechanism including the usual two spindles for the two film spools is mounted on the narrow second housing section to make the mechanism fully exposed and accessible for rapid and convenient film replacement when the two housing sections are separated. The second side wall on which the film transport mechanism is mounted is of hollow construction to enclose and protect the portion of the mechanism that controls the advance of the film and counts the exposures.

In addition to the two spool spindles, the film transport mechanism includes a laterally extending support means carrying a pressure plate, with a supply roller adjacent one end of the pressure plate and an idler roller adjacent the other end. The two spindles, the lateral extending support means and the two rollers are each mounted by one of its ends on the hollow side wall of the second housing section in the manner of a cantilever.

The required tightness and rigidity of these cantilever parts in the assembled magazine is accomplished, where desirable, by providing cooperative support elements in the open-sided shell or second magazine section. In the selected embodiment of the invention, the support elements are in the form of studs or fixed pins extending inward from the first side wall of the magazine to releasably engage the outer ends of the two spool spindles and to engage the outer end of the laterally extending support means that carries the pressure plate. A feature of this embodiment is that the support element that engages the outer end of the laterally extending support means releasably engages the support means in a manner to hold the two housing sections together.

The basic concept of arranging for the film transport mechanism to telescope retractably into the open-sided housing shell serves the primary purpose of full accessibility to the mechanism but introduces the problem of avoiding damage to the film in the course of the telescoping action. One possible cause for film damage is that when the two magazine sections are separate, the normal action of the pressure plate bulges the film in a manner to interfere with telescoping of the two sections together. Another possible cause is scraping of the film at the two ends of the magazine where the film passes around the two rollers.

As will be explained, the invention removes the first cause of film damage by providing means which automatically retracts the pressure plate from its effective position when the two housing sections are separated and automatically extends the pressure plate to its effective position in response to mating of the two housing sections. The invention removes the second cause by providing guide means to center the two housing sections relative to each other in the course of the operation of telescoping the two sections together.

A special object of the preferred practice of the invention is to provide a film transport magazine capable of accurately metering roll film without engaging perforations in the film. Thus the invention makes film perforations unnecessary. This object is accomplished by making the metering roller surface of a texture for engaging the film with a high coefficient of friction and by further routing the film under tension along a path in which the film engages substantially more than 180° of the metering roller.

The various features and advantages of the invention may be understood from the following detailed description and the accompanying drawings.

In the drawings, which are to be regarded as merely illustrative:

FIG. 1 is a perspective view of the completely assembled roll film magazine in the presently preferred practice of the invention;

FIG. 2 is a perspective view of the housing section that carries the film transport mechanism, the film being removed from the mechanism;

FIG. 3 is a diagrammatic view showing how the roll film is routed by the film transport mechanism.

FIG. 4 is a perspective view showing one stage in the re-assembling of the two housing sections after a new roll of film has been mounted on the film transport mechanism;

FIG. 7 is a side elevational view of the same structure as seen along the line 7—7 of FIG. 6;

FIG. 8 is a side elevational view looking into the open side of the second housing section;

FIG. 9 is a fragmentary section of the side wall of the second housing section taken as indicated by the line 9—9 of FIG. 8 and showing the support elements that cooperate with the film transport mechanism to support the film transport mechanism when the sections are mated;

FIG. 10 is another fragmentary section of the wall of the second housing section taken as indicated by the line 10—10 of FIG. 8 and showing screw means for interconnecting the two housing sections and also showing a stud which is part of the mechanism for causing extension of the pressure plate when the two housing sections are mated;

FIG. 11 is a side elevational view of the laterally extending support means of the first housing section, the view showing how the pressure plate is retracted from its effective position when the two housing sections are separated;

FIG. 12 is a similar view showing how the pressure plate is extended to its effective position when the two housing sections are assembled together;

FIG. 13 is an elevational view on an enlarged scale with parts broken away showing a portion of the mechanism for advancing the film;

FIG. 14 is an elevational view partly in section showing another portion of the mechanism for advancing the film; and FIG. 15 is an elevational view showing a stop member of the film-advancing mechanism as seen along the line 15—15 of FIG. 14.

Figure 5:
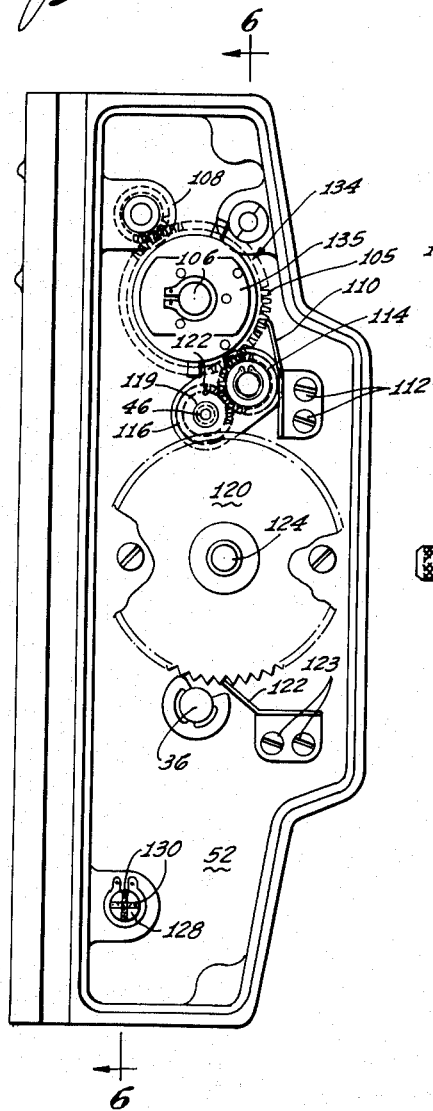
FIG. 5 is a side elevational view of the housing section that carries the film transport mechanism, the outer portion of the hollow side wall being removed to disclose the mechanism for advancing the film and for counting the film exposures.

In the drawings illustrating the presently preferred embodiment of the invention, the roll film magazine has a housing which, as best shown in FIG. 1, has a flat inner wall 20 which faces into the interior of a camera (not shown) when the magazine is in use. The flat inner wall has a rectangular aperture 22 for positioning at the focal plane of the camera for exposing a frame or film when the magazine is in use, the aperture being covered by a dark slide 24 when the magazine is separated from the camera. The housing has an end wall 25 (FIG. 1), a second opposite end wall 26 (FIG. 4), a first hollow side wall, generally designated 28, on which the film transport mechanism is mounted, a second side wall 30 (FIG. 8), and an outer wall 32 (FIGS. 4 and 8). The housing has two longitudinal side flanges 34 (FIG. 1) which are extensions of the inner wall 20 and which serve for releasably mounting the magazine on the back of a camera in a well known manner.

As indicated diagrammatically in FIG. 3, the film transport mechanism of the magazine includes a supply spool 35 releasably mounted on a spindle 36 to supply a length of film 38, a spring-loaded pressure plate or pressure pad 40 which serves the purpose of pressing the film against the rim of the previously mentioned rectangular aperture 22, an idler roller 42 adjacent one end of the pressure plate 40 in substantially tangential relation thereto, a metering roller 44 adjacent the other end of the pressure plate substantially tangentially thereof, and a take-up spool 45 on a spindle 46.

The magazine housing is divided longitudinally into a first section, generally designated A, which carries the previously described film transport mechanism and a second section, generally designated B, the parting line between the two sections being indicated at 48 as in FIG. 1. It is to be noted that the parting line 48 is spaced laterally from one side of the rectangular aperture 22, the rectangular aperture being in the second housing section B. Preferably the first housing section A consists substantially solely of the first hollow side wall 28 but, if desired, narrow portions of the inner wall 20, the outer wall 32 and the two side walls 25 and 26 may be included in the first housing section. Suitable light-sealing expedients (not shown) are provided between the two housing sections along the parting line 48 and are further provided on the inner wall 20 to seal the juncture between the film magazine and a camera on which it is mounted.

FIG. 4 shows the two housing sections A and B at a stage where the two sections are being brought together with the film transport mechanism loaded with film 38. It can be seen that the first housing section A comprises the first hollow side wall 28 with the film transport mechanism thereon and the second housing section B is an open-sided housing shell that includes the second opposite side wall 30 and the major portion if not all of the remaining housing wall.

The outer web 50 (FIG. 2) of the first hollow side wall 28 is removable for access to the interior of the wall and the inner web 52 (FIGS. 5, 6 and 7) carries the previously described film transport mechanism. As shown in FIG. 6, the two spindles 36 and 46 that are journaled in the inner web 52 are each formed with a portion 53 of square cross section for positive engagement with the corresponding film spool and each of the square portions is provided with detent means in the form of a spring-pressed ball 54 to releasably retain the corresponding film spool. In a well known manner, the spindle 36 for the supply spool is provided with a spring washer for suitable frictional resistance to rotation of the supply spool to place the film under a desirable degree of tension.

The outer ends of the two spindles 36 and 46 are provided with axial bores 56 (FIG. 6) which are chamfered as shown to cooperate with corresponding support means carried by the second housing section B. As shown in FIGS. 8 and 9, the cooperating support means comprises two fixed pins or studs 58 mounted on the inner side of the second side wall 30 of the second housing section B. It is apparent that when the two housing sections are separated, the two spindles 36 and 46 are cantilever members in that they are supported at only one of their ends, but when the two housing sections are assembled together the two pins 58 enter the axial bores 56 to cause the two spindles to be supported at both of their ends.

The previously mentioned pressure plate 40 is mounted on what may be termed a support means, generally designated 60, in the form of a thick web or transverse wall mounted on the inner face of the hollow side wall 28. Since the support means 60 is formed with a relatively large rectangular opening 62, as may be seen in FIGS. 11 and 12, the support means is, in effect, a rectangular frame with two longitudinal side portions 64 and 65 and two relatively wide opposite end portions 66 and 68. The pressure plate 40 is carried by means in the form of a rod 70 which extends across the rectangular opening 62 and is slidingly mounted in the two longitudinal side portions 64 and 65 of the support means 60.

The longitudinal edge 72 (FIGS. 6 and 7) of the support means 60 adjacent the longitudinal side portion 64 of the support means is tapered as shown and is formed with a rounded end 74 (FIGS. 11 and 12) to facilitate the entry of the support means into a complementary guide channel 75 (FIG. 8) that is formed on the inner face of the outer wall 32 of the magazine. The two housing sections cannot be assembled together unless the guide edge 72 of the support means 60 enters the guide channel 75 to cause the two spindles 36 and 46 on the housing section A to align with the two corresponding support pins 58 inside the second housing section B.

The sliding engagement of the guide edge 72 of the support means 60 with the guide channel 75 also insures that the two film rollers 42 and 44 are kept clear of the two end walls 25 and 26 to avoid damaging the film. In addition, the guiding action aligns a bore 76 of the support means 60 (FIG. 7) with a fixed operating member in the form of a stud or pin 78 on the inner side of the wall 30 of the second housing section and also aligns a tapped bore 80 in the support means 60 with the threaded shank 81 of a thumbscrew having a knob 82. The thumbscrew is journaled in a smooth bore 84 in the side wall of the housing section B and is retained by a snap ring 85.

With the threaded bore 80 and the threaded shank 81 brought into juxtaposition, the knob 82 may be rotated manually to screw the shank into the threaded bore to draw the two housing sections together and to releasably maintain the two housing sections assembled together. The tightening of the thumbscrew draws the end of the support means 60 against a shallow raised portion 86 of the side wall 30 of the second housing section B, which raised portion conforms to the cross-sectional configuration of the support means 60 as may be seen by comparing FIGS. 7 and 8.

*Automatic Control Mechanism for the Pressure Plate*

The operating member in the form of the fixed pin 78 carried by the wall 30 of the housing section B is the control member of a mechanism for automatically retracting the pressure plate 40 when the two housing sections are separated and for automatically advancing the pressure plate to an effective position when the two housing sections are assembled together. This automatic mechanism includes: a fixed collar 90 on the rod 70 that carries the pressure plate 40, the fixed collar serving as a spring seat; a coil spring 92 slidingly embracing the rod 70 in compression between the collar 90 and the longitudinal side portion 65 of the support means 60 to exert force against the collar for retraction of the pressure plate; a second heavier coil spring 94 slidingly mounted on the rod 70 with one of its ends in abutment against the collar 90 to exert force for advancing the pressure plate to its effective position; a slidable collar 95 on the rod 70 in abutment with the second end of the coil spring 64; a yoke 96 that is mounted on a pivot pin 98 and forked to straddle the rod 70 to act against the slidable collar 95; and a plunger 100 that is slidingly mounted in the previously mentioned bore 76, the plunger having a collar 102 on its inner end to keep the plunger from falling out of the bore when the two housing sections are separated.

When the two housing sections are separated, i.e., when the operating pin 78 is withdrawn from the bore 76, the parts of the mechanism are positioned as shown in FIG. 11. The spring 92 acting against the collar 90 of the rod 70 holds the pressure plate 40 in its retracted position, the second heavier spring 94 being only lightly stressed in compression since it merely holds the slidable collar 95, the yoke 96 and the plunger 100 retracted. When the two housing sections are assembled together the operating pin 78, which is shown in phantom in FIG. 12, enters the bore 76 and displaces the plunger 100 against the yoke 96 to swing the yoke from the dotted position in FIG. 12 to the position shown in solid lines. This swinging movement of the yoke 96 displaces the slidable collar 95 against the spring 94 to stress the spring 94 in compression to such extent as to cause the spring 94 to overcome the spring 92 and thus advance the pressure plate to its effective position against the film 38.

In the construction shown the operating pin 78 is in the form of a screw which, as may be seen in FIG. 10, may be adjusted from the exterior of the housing. In the course of fabrication of the film magazine, the screw 78 is adjusted to the position required for effective advance of the pressure plate 40 when the two housing sections are assembled together. The screw is then immobilized by the application of adhesive or suitable potting material.

*The metering mechanism for advancing the rolled film from frame to frame*

Figure 6:
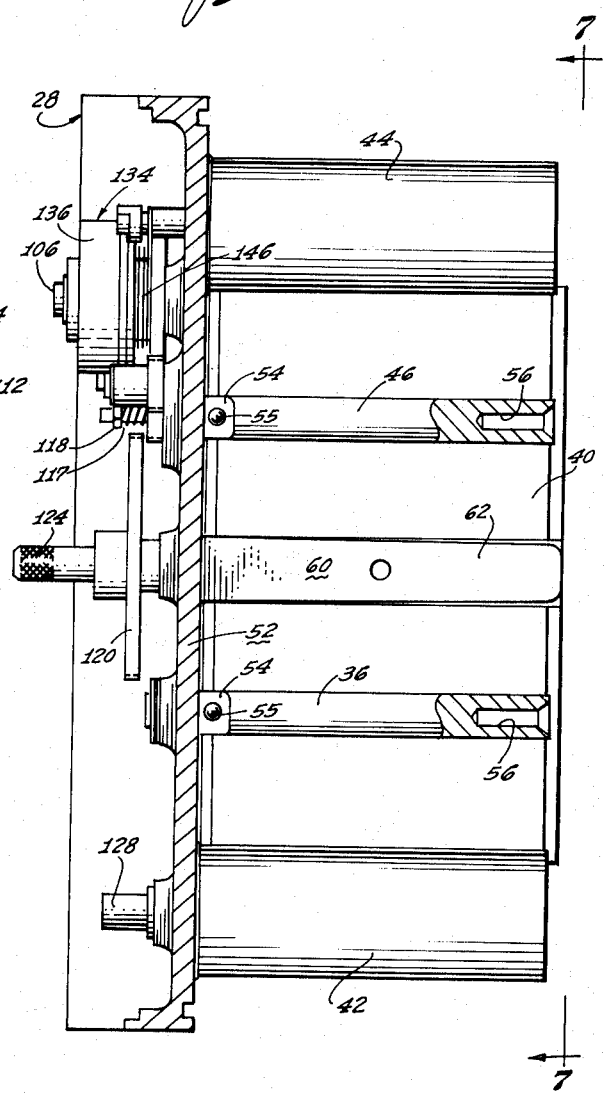
FIG. 6 is a plan view partly in section showing the same structure as FIG. 5 as seen along the line 6—6 of FIG. 5.

Referring to FIGS. 5 and 6, a drive gear 105 journaled on a spindle 106 on the inner web 52 of the hollow side wall 28 is in mesh with a driven gear 108 that is integral with the metering roller 44. In the construction shown, one revolution of the metering roller advances the film accurately from one frame to the next and the drive gear is three times the diameter of the driven gear so that a rotation of 120° on the part of of the drive gear advances the film by the required increment. A leaf spring pawl 110 mounted by suitable screws 112 engages the teeth of the drive gear 105 to prevent reverse rotation.

The drive gear 105 also meshes with a small idler gear 114 on a spindle 115 which in turn meshes with a driven gear 116. The driven gear 116 is united with the spindle 46 for the take-up spool 45 by a suitable friction clutch of a well known type which incorporates a coil spring 117 and is adjustable by a nut 118. The driven gear 116 is of the same diameter as the driven gear 108 and therefore makes one revolution for each advance of the film. In a well known manner, the friction clutch provides compensation for the progressive increase in the effective diameter of the take-up spool 45 as the film is progressively wound onto the spool.

The driven gear 116 carries a finger in the form of a pin 119 which in its orbital movement engages a tooth of a counter wheel 120 to advance the counter wheel by one tooth each time the film is advanced by one frame. The face of the counter wheel 120 is provided with numerals indicating the successive frames and the numerals successively register with a small window 121 (FIGS. 1 and 2) in the outer web 50 of the hollow side wall 28. A pawl in the form of a leaf spring 122 mounted by two screws 123 engages the teeth of the counter wheel 120 to prevent reverse rotation. The counter wheel has an elongated knurled hub 124 which protrudes from the exterior of the hollow wall 28 to permit manual setting of the counter wheel.

It is also desirable that the operator be able to check on whether or not the film is actually advanced when the film transport mechanism is operated. For this purpose a second window 126 is provided in the outer web 50 for observation of the end of the shaft 128 of the idler roller 42. In the construction shown, a pair of intersecting diametrical slots 130 (FIG. 5) are cut into the end of the shaft 128 to facilitate observation of rotation of the shaft.

The film transport mechanism is actuated by a reciprocative lever 132 (FIGS. 1–3) which is operatively associated with the drive gear 105 through the medium of a pawl-and-ratchet mechanism. Obviously, in such an arrangement the pawl means may be on either the lever or the drive gear with the ratchet means on the other of the lever and drive gear. FIGS. 5 and 6, in which the lever 132 is omitted, show a drum, generally designated 134, on which the lever is fixedly mounted for pivotal movement, the drum extending into the interior of the hollow side wall 28. The drum 134 is rotatably mounted on the spindle 106 that carries the drive gear 105, the drum having an outer end wall 135 and a circumferential wall 136.

An integral hub 138 of the drive gear 105 (FIG. 13) extends into the interior of the drum 134 and is formed with three ratchet teeth 140 spaced 120° apart. The drum 134 carries an interior pawl 142 that is mounted on a pivot 144 and is urged inward for engagement with the ratchet teeth 140 by a suitable wire spring 145. It is apparent that reciprocation of the lever 132 by approximately 120° causes corresponding rotation of the drive gear 105 to cause advance of the film 38 by one frame.

The lever or operating handle 132 is urged towards a normal limit position by a suitable torque spring 146 (FIG. 6), at which normal limit position a first radial pin 148 (FIGS. 14 and 15) on the exterior of the drum 134 abuts a plastic sleeve 150 on a fixed stop pin 152. The plastic sleeve, which may be made of nylon, is yielding to a slight but important degree to permit the lever to reciprocate by slightly more than 120° to insure that the pawl 142 will engage a new ratchet tooth 140 on each reciprocation of the lever. The lever is manually movable to a second limit position at which a second radial pin 154 on the drum 134 abuts the stop pin 152, the plastic sleeve 150 being cut away as shown to permit direct contact between the second radial pin and the stop pin.

Operation

The manner in which the described roll film magazine functions for its purpose may be readily understood from the foregoing description. Reciprocation of the manual lever 132 advances the film by one frame and the number of the frame may be observed through the window 125. Whether or not the film is actually advanced by the transport mechanism may be checked by looking into the second window 126 to observe whether or not the idler roller 42 rotates when the manual lever is reciprocated.

The metering roller 44 may be depended upon for positive engagement with the film 38 as required for accurate advancement of the film from frame to frame. The dependability of the metering roller for this purpose is assured by two provisions. The first provision is a surface texture for the metering roller that provides an effectively high coefficient of friction with respect to the film. In this particular embodiment of the invention such a texture is afforded by providing the metering roller 44 with an elastomeric sleeve 155 (FIG. 7).

The second provision is to provide relative locations for the metering roller 44 and the take-up spool 45 to cause the film 38 to wrap around substantially more than 180° of the circumference of the metering roller as indicated in FIG. 3. With the film 38 around the metering roller 44 maintained under effective tension by virtue of the friction clutch associated with the take-up spool 45 and by virtue of the frictional resistance to rotation of the supply spool 35, the engagement of the film with the peripheral surface of the metering roller 44 is as positive as the engagement of a sprocket roller with sprocket holes in a conventional roll film. It is because such positive engagement may be relied upon that the invention makes it possible to use plain film without sprocket holes. The initial embodiment of the invention is designed for 70 mm. film and the described compact arrangement of the parts of the film transport mechanism makes it possible for the film adapter to accept more footage of 70 mm. film than can be accommodated by any other roll film adapter heretofore prevalent in commerce.

When all of the roll film is exposed, the rectangular aperture 22 in the inner wall 20 of the magazine is closed by the dark slide 24 and it is then a simple matter to rotate the knob 82 of the thumbscrew to release the two housing sections for separation.

As soon as the operating pin 78 is withdrawn from the bore 76 of the support means 60 in the initial separation movement of the two housing sections, the plunger 100 and the yoke 96 are retracted by the force of the two springs 92 and 94 and with the heavier spring 94 relaxed, the lighter spring 92 acting against the fixed collar 90 on the rod 70 is effective to shift the rod for retraction of the pressure plate 40. When the exposed film has been replaced on the film transport mechanism, the pressure plate 40 remains retracted and thus does not cause the new film to bulge outward in a manner that would interfere with the telescoping of the film transport mechanism into the second housing section B. When the new film is safely inside the second housing B, however, the operating pin 78 again enters the bore 76 to cause the plunger 100, the yoke 96 and the slidable collar 95 to advance and thereby make the heavier spring 94 effective to urge the pressure plate 40 against the film to hold the film snug against the rim of the rectangular aperture 22.

Our description in specific detail of the selected embodiment of the invention will suggest various changes, substitutions and other departures from our disclosure within the spirit and scope of the appended claims.

We claim:

1. In a roll film magazine, the combination of:
a magazine housing having an outer wall, two end walls, a first side wall, a second side wall, and an inner wall with an aperture in the inner wall for exposing film at the focal plane of a camera,
said housing being divided into a first section and a second section with said aperture in the second section, said two sections being normally mated and releasably interconnected;
film transport means on said first section adapted to direct the film past said aperture of the second section;
a spring-loaded pressure plate mounted on said first section to press the film against the rim of the aperture in the second section; and
cooperative means on the two sections to retract said pressure plate to an ineffective position in response to separation of the two sections and to advance the pressure plate to an effective position in response to mating of the two sections.

2. A combination as set forth in claim 1 which includes a first spring urging retraction of the pressure plate and a second opposed spring urging advance of the pressure plate;
and in which said cooperative means includes control means movable in one respect in response to mating of the two sections to stress the second spring to overcome the first spring to advance the pressure plate to its effective position, said control means being movable in the opposite respect in response to separation of the two sections to relax the second spring to make the first spring effective to retract the pressure plate from its effective position.

3. In a roll film magazine, the combination of:
a magazine housing having an outer wall, two end walls, a first side wall, a second side wall, and an inner wall with an aperture in the inner wall for exposing film at the focal plane of a camera,
said housing being divided into a first section and a second section with said aperture on the second section, said two sections being normally mated and releasably interconnected;
film transport means on said first section adapted to direct the film past said aperture of the second section;
a pressure plate mounted on said first section to press the film against the rim of the aperture of the second section;
support means on said first section;
means carrying said pressure plate and slidingly mounted on said support structure to advance and retract the pressure plate;
first spring means acting between said carrying means and said support structure to retract the pressure plate;
second spring means having one end operatively connected to said carrying means;
control means on said second section operatively connected to the second end of the second spring, said control means being operative to stress said second spring means to overcome the first spring means to advance the pressure plate; and
means on said second section to operate said control means in response to mating of the two sections.

4. In a roll film magazine, the combination of:
a magazine housing having an outer wall, two end walls, a first side wall, a second side wall, and an inner wall with an aperture in the inner wall for exposing film at the focal plane of a camera,
said housing being divided into a first section and a second section with said aperture in the second section, said two sections being normally mated and releasably interconnected;
film transport means on said first section adapted to direct film past said aperture of the second section;
a pressure plate mounted on said first section to press the film against the rim of the aperture of the second section;
support means on said first section;

a rod carrying said pressure plate and movably mounted on said support structure to advance and retract the pressure plate;

a first spring seat fixedly mounted on said rod;

a first coil spring surrounding said rod in compression between said support means and said first spring seat to retract the pressure plate from its effective position when the two sections are separated;

a second spring seat slidingly mounted on said rod;

a second coil spring surrounding said rod in compression between the two spring seats to advance the pressure plate to an effective position when the two sections are mated; and means to shift said second spring seat against said second spring in response to mating of the two sections thereby to overcome the first spring.

5. In a roll film magazine, the combination of:

a magazine housing having an outer wall, two end walls, a first side wall, a second side wall, and an inner wall with an aperture in the inner wall for exposing film at the focal plane of a camera, said housing being divided into a first section and a second section with said aperture in the second section, said two sections being normally mated and releasably interconnected;

film transport means on said first section adapted to direct the film past said aperture of the second section;

support means extending from said first section laterally thereof;

a spring-loaded pressure plate on said support means to press the film against the rim of the aperture in the second section;

film transport means mounted on said first wall of said first section and adapted to direct the film in a path past said aperture of the second section, said film transport means including two spindles for a film supply spool and a film take-up spool, respectively, one end of each of said spindles being mounted on said first section;

two support elements on said second section corresponding to the two spindles, respectively, to engage and support the other ends of the two spindles in response to mating of the two sections; and means on said second section for sliding engagement with said support means to guide the two sections towards each other and to align said spindles with the corresponding support elements;

a spring-loaded pressure plate mounted on said first section to press the film against the rim of the aperture of the second section; and cooperative means on the two sections to retract said pressure plate to an ineffective position in response to separation of the two sections and to advance the pressure plate to an effective position in response to mating of the two sections.

6. In a transport mechanism for use with roll film in a camera without engaging perforations in the film, the combination of:

a pressure plate to press the film into the focal plane of a camera;

a metering roller adjacent one end of the pressure plate approximately tangentially thereof to drive the film;

an idler roller adjacent the other end of the pressure plate approximately tangentially thereof to cooperate with the metering roller to direct the film across the pressure plate;

a film take-up spool back of said pressure plate between one end of the pressure plate and the midpoint of the pressure plate;

a film supply spool back of the pressure plate between the other end of the pressure plate and the midpoint of the pressure plate, said metering roller having a peripheral surface of a texture for contact with the film with a high coefficient of friction, said film take-up spool being close to the back surface of the pressure plate to wrap the film around substantially more than 180° of the circumference of the metering roller whereby the metering roller frictionally engages the film without slippage; and means to actuate said metering roller and said take-up spool simultaneously.

7. A combination as set forth in claim 6 in which means to actuate the metering roller and the take-up spool includes:

a relatively large drive gear;

a first relatively small driven gear fixedly connected to the metering roller and in mesh with the drive gear;

a second relatively small driven gear yieldingly connected to said take-up spool for actuation thereof;

an idler gear in mesh with both the driven gear and the second small gear for actuation of the take-up spool;

a manually operable lever adapted to swing about the axis of the drive gear;

a circumferential series of ratchet teeth concentric to said axis and fixedly connected to one of said drive gear and lever, the circumferential arc between successive ratchet teeth corresponding to the required advance of the film from one frame to the next frame;

a pawl on the other of said drive gear and lever to engage said ratchet teeth;

stop means to limit the swinging movement of said lever to substantially said arc; and spring means to return said lever to a normal starting position against one of said stops.

8. A combination as set forth in claim 7 in which said one stop is a yielding stop.

References Cited by the Examiner

FOREIGN PATENTS 1,076,488    2/1960    Germany.

EVON C. BLUNK, *Primary Examiner.*